(12) United States Patent
Bourret

(10) Patent No.: US 7,133,066 B2
(45) Date of Patent: Nov. 7, 2006

(54) IMAGE PROCESSING

(75) Inventor: Alexandre J Bourret, Ipswich (GB)

(73) Assignee: British Telecommunications public limited company, London (GB)

( * ) Notice: Subject to any disclaimer, the term of this patent is extended or adjusted under 35 U.S.C. 154(b) by 601 days.

(21) Appl. No.: 10/221,780

(22) PCT Filed: Mar. 29, 2001

(86) PCT No.: PCT/GB01/01414

§ 371 (c)(1),
(2), (4) Date: Sep. 17, 2002

(87) PCT Pub. No.: WO01/75799

PCT Pub. Date: Oct. 11, 2001

(65) Prior Publication Data

US 2003/0039404 A1 Feb. 27, 2003

(30) Foreign Application Priority Data

Mar. 31, 2000 (EP) .................................. 00302779

(51) Int. Cl.
*H04N 17/00* (2006.01)

(52) U.S. Cl. .................. 348/180; 348/189; 348/190; 348/581; 382/294

(58) Field of Classification Search ........... 348/184, 348/564–565, 581, 180, 185–190; 345/629, 345/632–633, 641, 660, 661–662; 382/151, 382/294

See application file for complete search history.

(56) References Cited

U.S. PATENT DOCUMENTS

| | | | |
|---|---|---|---|
| 5,446,492 A | 8/1995 | Wolf et al. | |
| 5,550,937 A * | 8/1996 | Bell et al. | .................... 382/293 |
| 5,589,884 A | 12/1996 | Ohguchi | |
| 5,619,588 A | 4/1997 | Yolles et al. | |
| 5,799,133 A | 8/1998 | Hollier et al. | |
| 6,014,183 A | 1/2000 | Hoang | |

(Continued)

FOREIGN PATENT DOCUMENTS

DE 19521408 C1 12/1996

(Continued)

OTHER PUBLICATIONS

Franti, "Image Quality Measure Based on Local Visual Properties", Picture Coding Symposium 97, Sep. 10-12, 1997, No. 143, pp. 217-220.

(Continued)

*Primary Examiner*—Trang Tran
(74) *Attorney, Agent, or Firm*—Nixon & Vanderhye P.C.

(57) ABSTRACT

A method of aligning a first image with a second image, the method includes approximately locating the second image; scaling the first image to the approximate size of the second image; positioning the scaled first image over the approximate location of the second image; generating a measure of fit between the first image and the second image; repositioning the second image and repeating the above steps to obtain an increased measure of fit value. A method of synchronizing a first sequence of images with a second sequence of images includes creating a first index pointer identifying an image in the first sequence of images; creating a second index pointer identifying an image in the second sequence of images; comparing the image identified by the first index pointer with the image identified by the second index pointer; incrementing the first index pointer to identify the subsequent image in the first sequence of images; and repeating the above steps until the image identified by the first index pointer matches the image identified by the second index pointer.

6 Claims, 3 Drawing Sheets

U.S. PATENT DOCUMENTS

| | | | |
|---|---|---|---|
| 6,119,083 A | 9/2000 | Hollier et al. | |
| 6,271,879 B1* | 8/2001 | Overton | 348/180 |
| 6,295,083 B1* | 9/2001 | Kuhn | 348/190 |
| 6,363,116 B1* | 3/2002 | Edwards et al. | 375/240.21 |
| 6,483,538 B1* | 11/2002 | Hu | 348/180 |
| 6,853,355 B1* | 2/2005 | Kang et al. | 345/2.2 |

FOREIGN PATENT DOCUMENTS

| | | |
|---|---|---|
| EP | 0938239 A1 | 8/1999 |

OTHER PUBLICATIONS

Rix et al, Models of Human Perception, BT Technology Journal, vol. 17, No. 1, Mar. 19, 1999, pp. 24-34, XP000824576.

Tan et al, "An Objective Measurement Tool for MPEG Video Quality", Signal Processing, European Journal Devoted to the Methods and Applications of Signal Processing, vol. 70, 1998, pp. 279-297, XP004144970.

U.S. Appl. No. of Hollier et al, 09/889,041, filed Jul. 11, 2001.

U.S. Appl. No. of Bourret, 10/275,474, filed Nov. 6, 2002.

International Search Report dated May 28, 2001.

* cited by examiner

IMAGE PROCESSING

BACKGROUND

1. Technical Field

This invention relates to the field of image processing, and in particular the processing of video sequences.

2. Related Art

Digital video systems rely on the imperfections of human vision and perception to render a video sequence by transmitting a decreased amount of information. As a result the subjective quality of a digital video system can be difficult to predict, because it is unrelated to the objective degradation present in the rendered video sequence. At present, the only reliable method by which the subjective video quality can be assessed is to run subjective tests, where a number of people give their opinion regarding the quality of an observed video sequence. Subjective testing is expensive and time consuming, and additionally not suitable for all applications, for example real time assessment of service quality.

Furthermore, most objective models to assess the quality of digital video systems are designed to compare systems constrained by broadcast standards. This makes it easier to realign the two video streams as the degraded sequence has the same characteristics as the original sequence in terms of frame rate, frame size and the position of the frame within a restricted search window. If an objective model has to assess the quality of digital video systems in multimedia applications, different variables will have an effect and will need to be accounted for. For example, there is no indication about the image standard that can be expected at the output of the system to be tested: while the original sequence could be in a broadcast format, the degraded sequence might be CIF, QCIF, or any frame size and/or resolution chosen by the user of a multimedia application. Furthermore, the degraded sequence is likely to be presented in a software window, which could be located anywhere on a computer screen, with the user having control over the size and aspect ratio of the window.

One application that is commercially available at present, the Tektronix implementation of the JNDmetrix model, has solved this problem with the introduction of a calibration signal, which contains time stamp information. Though very reliable, this technique is invasive, because the time stamp adds some visual features and an important amount of movement to the sequence being tested. The timestamp is visible across the screen, which excludes the use of the system in any real time assessment of video services. Also, it can be argued that as the system has an influence on the image content it therefore affects the performance of the video system under test.

BRIEF SUMMARY

According to a first aspect of the invention there is provided a method of aligning a first image with a second image, the method comprising the steps of;

(i) approximately locating the second image;
(ii) scaling the first image to the approximate size of the second image;
(iii) positioning the scaled first image over the approximate location of the second image;
(iv) generating a measure of fit between the first image and the second image;
(v) re-positioning the second image;

and repeating steps (iv) and (v) to obtain an increased measure of fit value.

Preferably, step (iv) and step (v) are repeated until a threshold measure of fit value is obtained.

Alternatively, steps (iii), (iv) & (v) are replaced by:

(a) reducing the size of the first image to a size smaller than the approximate size of the second window;
(b) positioning the reduced first image within the approximate location of the second image;
(c) generating a measure of fit between the reduced first image and the second image;
(d) moving the reduced first image to a further position within the approximate location of the second image;

steps (c) and (d) being repeated to obtain an increased measure of fit value. Steps (c) and (d) may be repeated to generate a maximum measure of fit value for that first image size. If the maximum measure of fit value for that first image size does not reach a threshold measure of fit value then the first image may be further reduced in size and the maximum measure of fit value generated for that further reduced size.

According to a second aspect of the invention there is provided a method of synchronising a first sequence of images with a second sequence of images, the method comprising the steps of;

(a) creating a first index pointer identifying an image in the first sequence of images;
(b) creating a second index pointer identifying an image in the second sequence of images;
(c) comparing the image identified by the first index pointer with the image identified by the second index pointer;
(d) incrementing the first index pointer to identify the subsequent image in the first sequence of images; and
(e) repeating steps (c) and (d) until the image identified by the first index pointer matches the image identified by the second index pointer.

The invention also provides a method of aligning both spatially and temporally a first video sequence with a second video sequence, wherein the spatial alignment is as described above and the temporal alignment is as described above

BRIEF DESCRIPTION OF THE DRAWINGS

Systems embodying the present invention will now be described in further detail, by way of example only, with reference to the accompanying drawings, in which.

DETAILED DESCRIPTION OF EXEMPLARY EMBODIMENTS

Figure 1:
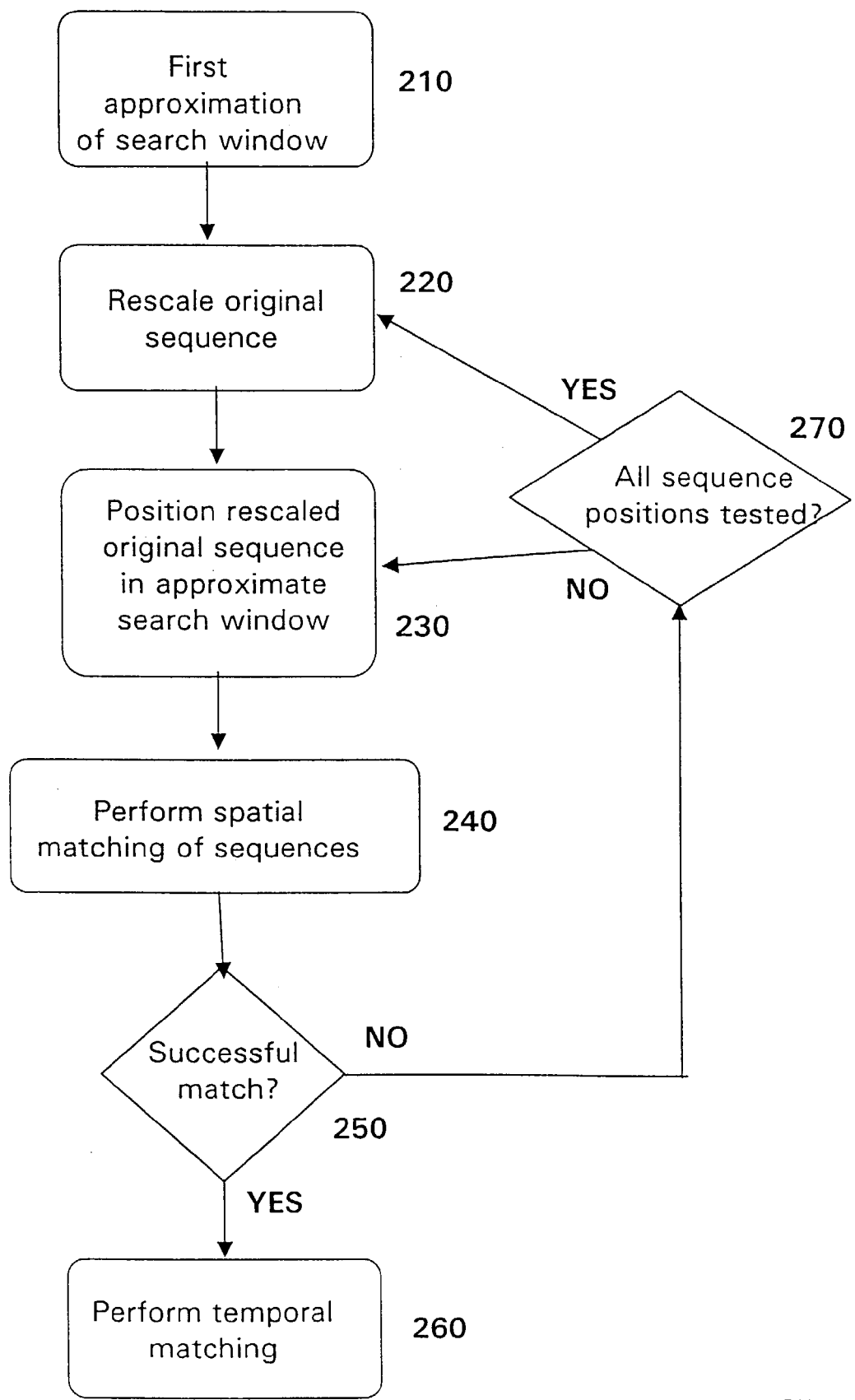
FIG. 1 is a flowchart describing a method according to the present invention of aligning two video sequences.

The visual comparison model of interest is a tool to assess the performances of digital video systems (see WO 97/32428 and M P Hollier et al, *"Multi-modal perception"*, BTTJ, vol. 17, no. 1, January 1999). By analysing the differences between the reference, or original sequence, and the processed, or degraded sequence, the visual comparison model is able to make a prediction of the subjective impact the errors will have on the user. The model is meant to work with both broadcast video quality, and computer or multimedia applications.

One of the aspects that can greatly decrease the performance of such a visual comparison model is the lack of synchronisation and alignment between the two sequences being compared. For instance, a slight delay or a displacement of a few pixels between the degraded sequence and the reference sequence would lead the model to detect a large number of errors, though these would not be perceived by an observer. As a slight spatial delay (typically of a few pixels) and a temporal delay are likely to be found at the output of any codec system. An initial pre-processing of the degraded sequence to align it to the reference sequence is necessary before a comparison model can be used to analyse the two sequences. Because they are most often research prototypes, test models present in the literature (see for example, A S Karunasekera & N G Kingsbury, "*A Distortion Measure for Blocking Artifacts in Images Based on Human Visual Sensitivity*", IEEE Transactions On Image Processing, vol. 4, No. 6, June 1995 and K T Tan et al, "*A video distortion meter*", Picture Coding Symposium, Berlin September 1997) do not account for this problem. The original sequence and the degraded sequence are assumed to be already spatially and temporally aligned, presumably by some form of manual intervention.

One aspect of the visual comparison model is to work by matching perceptual features present in the both sequences (see Hollier et al, op cit.). Because of this property, it is possible to consider that the initial synchronisation steps are unnecessary. Nevertheless, any comparison operation is done within a search window, and the processing cost and risk of making a comparison error increases significantly with the size of the search window. Furthermore, and because of the large number of sequence types a visual comparison model is likely to work with, the synchronisation information will involve more variables than previous models. For example, the image could be re-sized or re-scaled. It is therefore necessary for practical reasons to obtain a first estimate of the synchronisation between the original sequence and the degraded sequence, as well as the alterations that may have occurred.

The alterations that the image sequence is likely to have endured may include:

ξ Horizontal displacement. In broadcast conditions, this synchronisation problem is quite likely. It is caused by delay in the transmission channel, as well as by synchronisation problems with the digital-to-analogue converter (DAC).

ξ Vertical displacement. This is rare in an analogue broadcast system, where the position of the picture within the video frame is constrained by the broadcast standard. However, this aspect is not controlled in a multimedia application, where the sequence can be displayed where the user wants it, with the user controlling the position of the video application window.

ξ Time delay. This will be present whenever video codec (coder-decoder) systems are used in a transmission channel. Its value can vary according to the type of codec or algorithm in used. Typically, systems such as H263, designed for videoconference applications have a short delay (about a second), to prevent discomfort occurring during conversation. Broadcast systems can have a longer time delay to allow the system more processing time.

ξ Randomised time delay characteristics. Most network applications will sequence a digital video sequence into a stream of packets, with each of them taking a different amount of time to be transmitted across a network. It is possible that the frames may arrive out of sequence. The delay between the degraded sequence and the reference sequence is therefore likely to vary throughout the duration of the sequences.

ξ Missing frames. This phenomenon occurs frequently as the compression rates are increased. For example, a common standard for good quality digital video applications is 15 frames per seconds [i.e. half the frame rate of the standard NTSC signal]. For most codecs and encoding algorithms the frame rate can vary in time, decreasing if the amount of movement in the video sequence is increasing. This may result in a random correspondence between the frame present in the original sequence and its match in the degraded sequence.

ξ X and Y size. The position of the image within the video frame is fixed in broadcast standards, but this parameter can be chosen (and varied) by the user in multimedia applications.

To address these problems, a synchronisation method uses the information already present in the video frames to synchronise the two streams.

To achieve this, it compares both streams in order to match each frame present in the degraded sequence with a frame present in the original sequence. Because of the size of the problem space to be searched, synchronising and aligning a video sequence present on a computer screen is a huge computational problem in itself. As the synchronisation process is merely the prelude to the use of the visual comparison model, it is not feasible to be searching for all of the synchronisation parameters all time It should be noted that in order for a visual comparison model to function effectively it is necessary that each of the synchronisation parameters are accurate all of the time. Also, some of these parameters will not vary, or will vary at a low rate, with time, for example the position and/or size of the degraded sequence will not vary in a broadcast application and in a multimedia context will only change when the user is modifies the output window. Thus it is most effective to spatially synchronise the sequences initially and then search constantly to determine the temporal synchronisation of the sequences (i.e. what is the delay in propagation and are frames missing).

The proposed synchronisation algorithm is shown in flowchart form in FIGS. 1–3 and described below.

For the initial stages of synchronisation and during the spatial matching of the sequences a calibration signal (which provides a constant pattern) can be used, making the search easier and hence quicker. If the video comparison model is to be used to assess the quality of a system which is in use then clearly this is not an option and the video sequence in use must be matched.

Referring to FIG. 1, the first step 210 is to gain an approximate location and size of the window containing the degraded sequence of interest. This search window approximation may be provided by the user 'lassoing' the degraded sequence window using a mouse or by using a system call that provides information regarding the window position for a given thread (for example the Windows functions GetViewportExt and GetWindowOrigin from CSize structure). As a default the approximation can be taken to be the entire screen area, although this will increase the time taken to perform the later steps needed to match the sequences spatially if the window is significantly smaller than the entire screen area. If the degraded video sequence is in a broadcast application then this default approximation is more reliable.

Once the approximation has been made, the original video sequence must be changed to the approximate size and shape of the degraded video sequence (see step 220) so that it is possible to compare the two video sequences. The rescaled original sequence is placed within the approximated search window (step 230) and the spatial matching algorithm is used (step 240) to determine the optimum spatial match between the sequences (see FIG. 2 and description below). Once the two sequences have been successfully matched spatially then it is possible to begin the temporal matching process (step 260 and FIG. 3).

Figure 2:
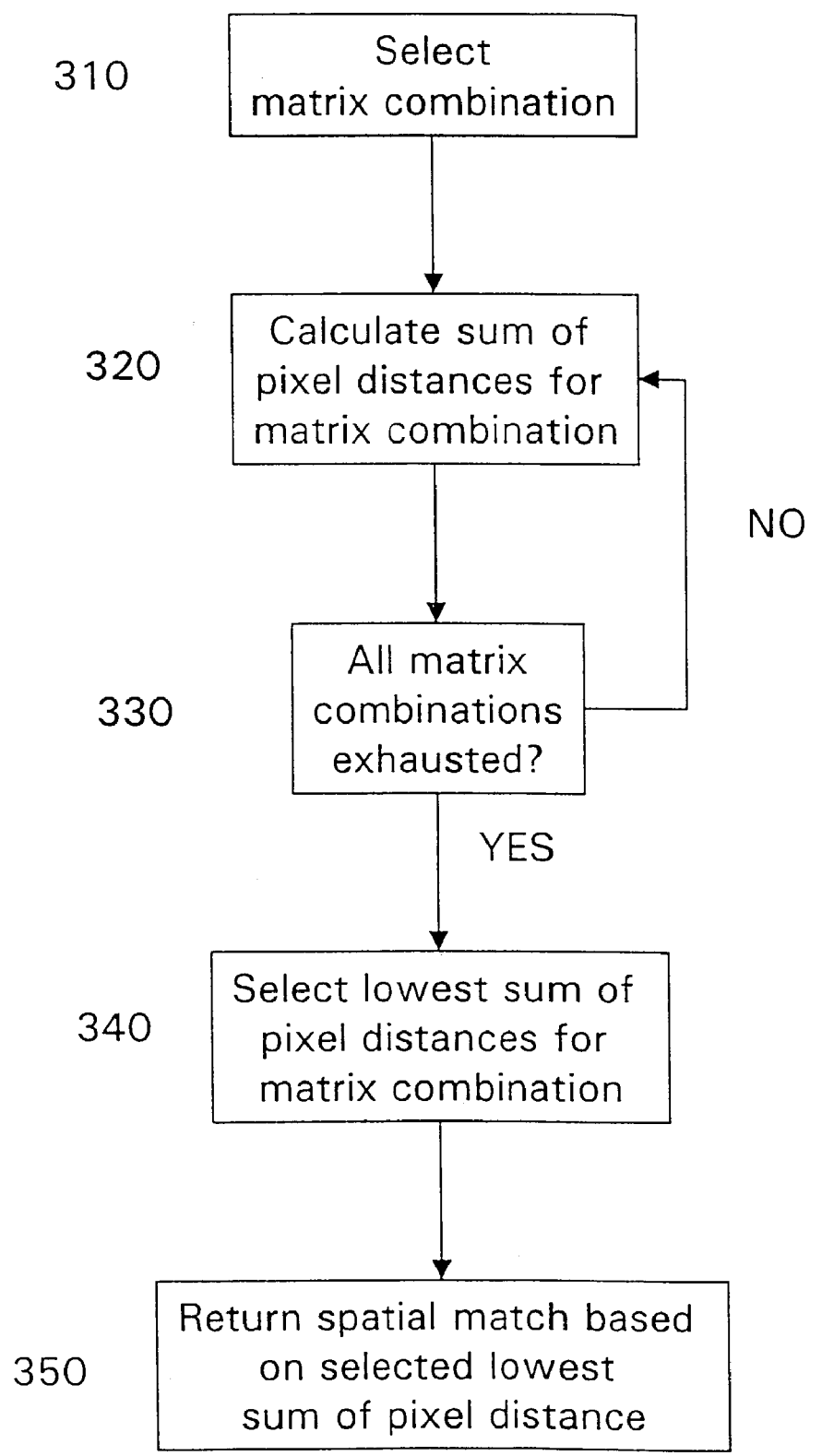
FIG. 2 is a flowchart describing a method according to the present invention of spatially aligning two video sequences.
Figure 3:
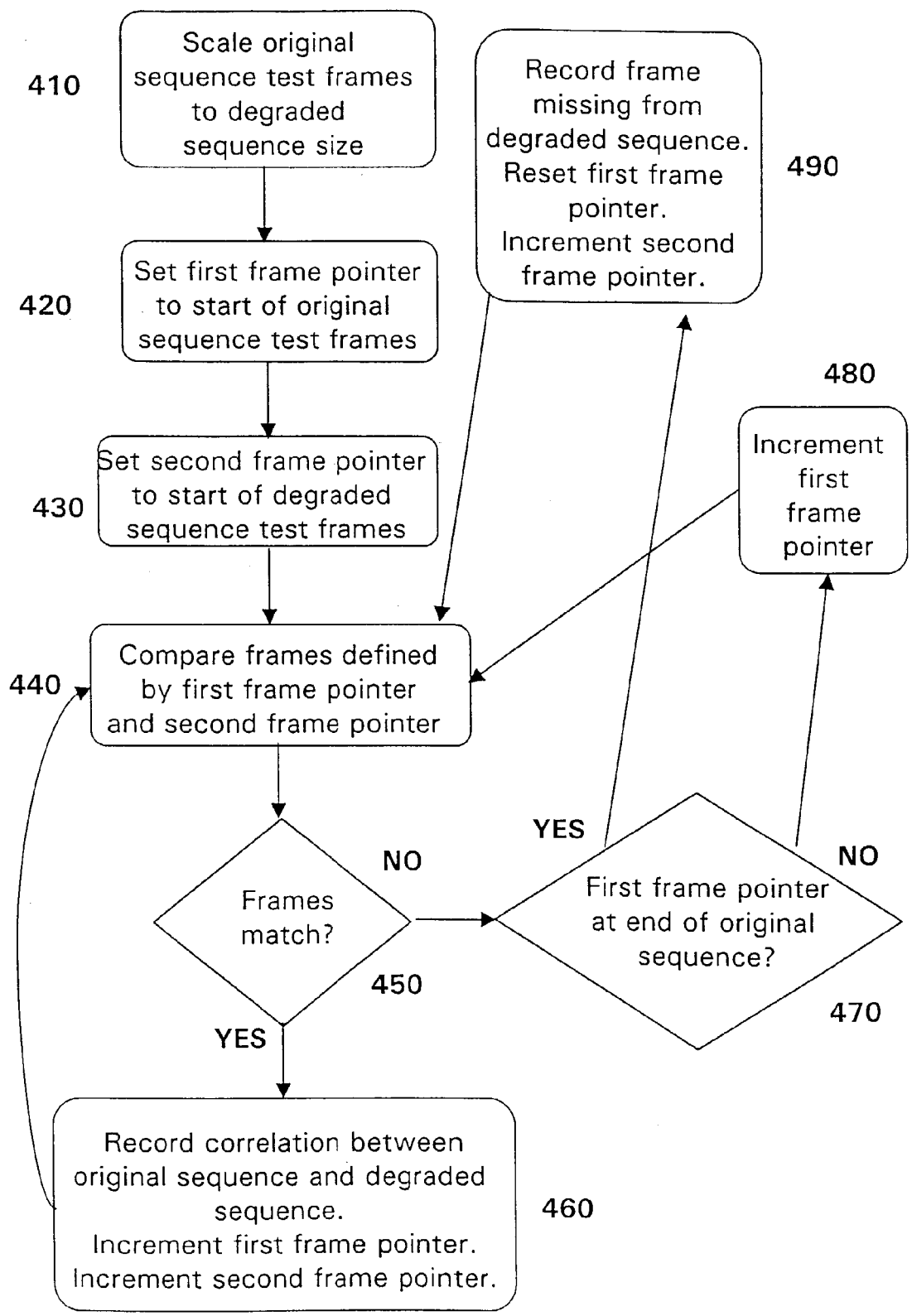
FIG. 3 is a flowchart describing a method according to the present invention of temporally aligning two video sequences.

The flow chart for the spatial matching process is shown in FIG. 2. Each video sequence comprises a number of pixels, which can be regarded as forming a matrix, for example the original sequence can be considered to comprise a matrix O having i columns and j rows and the degraded sequence to comprise a matrix D having p columns and q rows. The first iteration of the comparison is performed by calculating the distance between the pixel from the original sequence and the corresponding pixel from the degraded sequence. The pixel distance parameter is calculated for each of the entries in the two matrices e.g. by comparing O(1, 1) with D(1, 1), O(1, 2) with D(1, 2), etc. for all values of i, j, p & q. If the two matrices do not have equal dimensions (i.e. if i≠p or j≠q) then dummy entries having zero values are created for the smaller matrix so that all of the matrix entries of the larger matrix can be compared. All of the difference calculation results are summed to give a measure of the difference between the original sequence and the degraded sequence for that iteration. A second iteration is then calculated, with an offset of one row (or alternatively one column) being introduced into one of the matrices: for example comparing O(1, 1) with D(1, 2), O(1, 2) with D(1, 3) up to O(1,j) with D(1,1) (and similarly for the other columns of the matrix). Alternatively O(1, 1) can be compared with D(2, 1), 0(2, 1) with D(3, 1) up to O(i,1) with D(1,1) (and similarly for the other rows of the matrix). The iterations are concluded until all of the possible combinations have been exhausted i.e. a total of (i−1) column shifts and (j−1) row shifts to give i+j−2 different comparison measures. The pixel distance is defined by $$\text{Distance} = \sqrt{(\text{deltaL})^2 + (\text{deltaS})^2 + (\text{deltaH})^2}$$

where deltaL is the difference between the luminance of the original pixel and the luminance of the degraded pixel, deltaS is the difference between the colour saturation of the original pixel and the colour saturation of the degraded pixel and deltaH is the difference between the hue of the original pixel and the hue of the degraded pixel. Whilst deltaL and deltaS may be calculated by a simple subtraction, due to the rotational nature of the hue value, deltaH is given by the minimum of [($H_{original} - H_{degraded}$); ($256 - H_{original} + H_{degraded}$)] {all values of H, L & S lying between 0 and 255. The conversion of RGB data to HSL data is well known to those skilled in the art of video technology}.

Additionally, it is possible to 'stretch' one of the matrices to generate two matrices of equal size (and calculating interpolated values from the contents of the 'stretched' matrix) and then perform the same distance calculations for the different combinations of pixels as described above.

Referring to FIG. 2, in step 310 an initial combination is made of the matrix representing the original sequence and the matrix representing the degraded sequence. The sum of all the pixel distances for this matrix combination is calculated in step 320 and then stored. If all the possible matrix combinations have not been exhausted then a further matrix combination is chosen and the sum of all the pixel distances is calculated. Once this summation has been made for all of the possible matrix combinations then a comparison is made and the lowest summation value is chosen. The matrix combination which generated this lowest summation value is chosen as the optimal spatial match of the two sequences and this match is returned to step 270.

Once an approximation of the size and position of the target screen has been found, then the temporal matching process of the synchronisation program can be run. However, if the spatial synchronisation between the two video sequences is lost, then the matching process must be restarted. The flowchart of the temporal matching process is shown in FIG. 3. A number of frames from the original sequence are scaled down to the size of the search window (as determined above) and stored (see 410). For convenience the frames that are scaled down and stored are taken from some known reference point, e.g. the first n (or the last n) frames of the sequence, such that the corresponding part of the degraded sequence can be located approximately. A first frame pointer is set to indicate the start of the original sequence test frames (step 420) and a second frame pointer is set to indicate the start of the degraded sequence test frames (step 430).

The two frames identified by the first and second frame pointers are then compared to see if the two frames match (step 440). If the frames do match (step 450) then the correlation between the two frames is recorded (step 460), for example the transmission delay between the original sequence test frame and the degraded sequence test frame and the relative position of the test frame in the two sequences to indicate whether the frames have been delivered in the correct order. Then both the first and the second frame pointer are incremented and the matching process (440) is repeated.

If the compared frames do not match (step 450) then the first frame pointer is incremented to identify the next test frame in the original sequence (step 480) and the matching process (step 440) is repeated. This loop is continued until there is a match between two frames or until the original sequence test frames have been compared with the current degraded test frame. If this occurs then the degraded sequence is missing a frame and this fact is recorded (step 490). Once all of the frames in the degraded sequence have been matched it should be possible to infer which frame (or frames) is (are) missing from the degraded sequence. The first frame pointer is reset to the start of the original sequence test frames and the second frame pointer is incremented to identify the next test frame in the degraded sequence and the matching process can be repeated (step 440).

The matching process is repeated until all of the test frames from the degraded sequence have been matched.

Searching for matching frames along the time axis is still a computationally expensive process. In a real time application, the search space could be as large as 2 or 3 seconds of a video sequence, which could represent about 150 frames for both the original and the degraded sequences, depending upon the video signal format. Therefore, further assumptions can be taken to reduce the search space. For instance, the degraded sequence can be assumed to keep the same temporal continuity as the original, i.e. that the system under use can be assumed not to mix the order of the frames.

Where the video sequence is being transmitted over a network that only provides a "best effort" quality of service, such as the internet, then it may be necessary to repeat the spatial matching process on a periodic basis.

The inventor has developed a working prototype of the invention for use with a standard Windows NT or Linux workstation, created in Labview, but will be understood that other programming languages or development environments are suitable for implementing the present invention. It is also possible to implement the invention in hardware, using a number of DSPs (digital signal processors).

What is claimed is:

1. A method of synchronizing a first sequence of images with a second sequence of images, the method comprising aligning the sequences spatially by performing, on one or more sample frames method comprising:
   (i) identifying the location of the second image within a window;
   (ii) scaling the first image to the approximate size of the second image;
   (iii) positioning the scaled first image in the window in a position approximately corresponding to the location of the second image in its window;
   (iv) generating a measure of fit between the first image and the second image;
   (v) re-positioning one of the images
   and repeating steps (iv) and (v) to identify positions having an increased measure of fit value;
   and then synchronizing the sequences by:
   (a) creating a first index pointer identifying an image in the first sequence of images;
   (b) creating a second index pointer identifying an image in the second sequence of images;
   (c) comparing the image identified by the first index pointer with the image identified by the second index pointer;
   (d) incrementing the first index pointer to identify the subsequent image in the first sequence of images; and
   (e) repeating steps (c) and (d) until the image identified by the first index pointer matches the image identified by the second index pointer.

2. The method as in claim 1, wherein step (iv) and step (v) are repeated until a threshold measure of fit value is obtained.

3. The method as in claim 1, wherein the size of the first image is initially reduced to a size smaller than the size of the window containing the second image, and a maximum measure of fit value for that first image size is determined.

4. The method as in claim 3, wherein if the maximum measure of fit value for that first image size does not reach a threshold measure of fit value then the first image is further reduced in size and the maximum measure of fit value generated for that further reduced size.

5. A method of aligning a first image with a second image, the method comprising:
   (i) identifying the location of the second image within a window;
   (ii) scaling the first image to the approximate size of the second image;
   (iii) positioning the scaled first image in the window in a position approximately corresponding to the location of the second image in its window;
   (iv) generating a measure of fit between the first image and the second image;
   (v) re-positioning one of the images
   and repeating steps (iv) and (v) to identify position having an increased measure of fit value, wherein the size of the first image is initially reduced to a size smaller than the size of the window containing the second image, and a maximum measure of fit value for that first image size is determined, and if the maximum measure of fit value for that first image size does not reach a threshold measure of fit value then the first image is further reduced in size and the maximum measure of fit value generated for that further reduced size.

6. The method of aligning the first image with the second image as in claim 5, wherein step (iv) and step (v) are repeated until the threshold measure of fit value is obtained.

* * * * *